March 1, 1949. P. E. BOWES 2,462,940
LOW-PRESSURE MOLDING
Filed Oct. 2, 1946 2 Sheets-Sheet 1
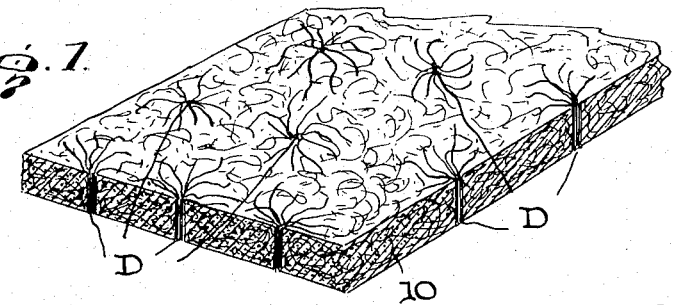
Fig. 1
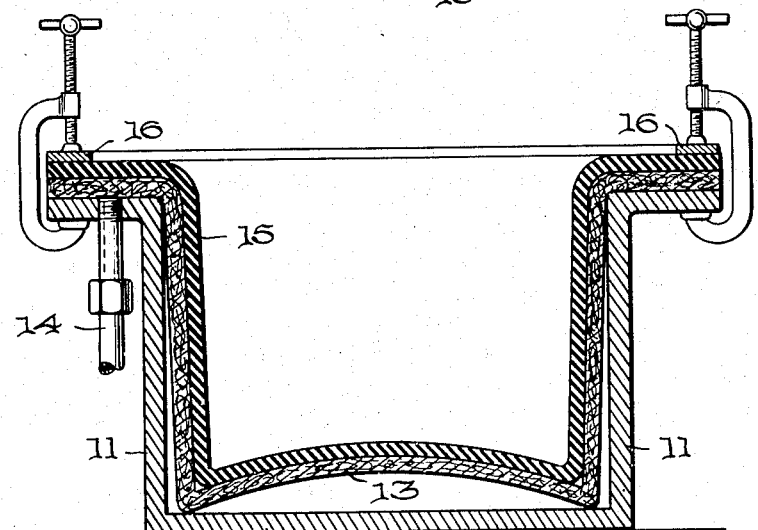
Fig. 2
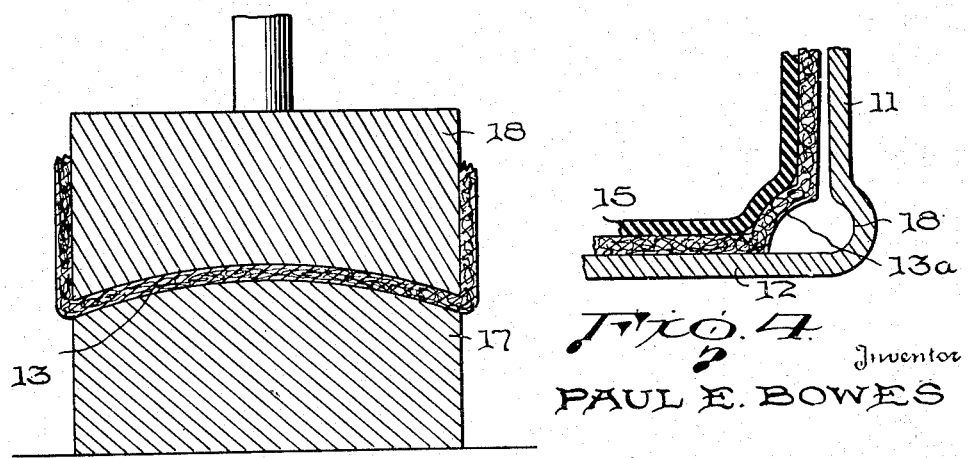
Fig. 3
Fig. 4
Inventor
PAUL E. BOWES
By Church & Church
His Attorneys March 1, 1949. P. E. BOWES 2,462,940
LOW-PRESSURE MOLDING
Filed Oct. 2, 1946 2 Sheets-Sheet 2

Inventor
PAUL E. BOWES
By Church & Church
His Attorneys

Patented Mar. 1, 1949

2,462,940

UNITED STATES PATENT OFFICE 2,462,940

LOW-PRESSURE MOLDING

Paul E. Bowes, Auburn, N. Y., assignor to Columbian Rope Company, Auburn, N. Y., a corporation of New York Application October 2, 1946, Serial No. 700,721

2 Claims. (Cl. 18—56)

This invention relates to improvements in so-called methods of low-pressure molding of plastic compositions of a binder and a filler material comprising comparatively long filaments, for instance, stapled vegetable fibers.

The primary object of the invention is to provide a method of molding such compositions, using comparatively low pressures, in which a uniform molding of the composition is obtained on mold surfaces having angles or concave areas therein, the method being especially applicable in the use of mold surfaces where said angles and concave areas are of short radii and can be bridged or spanned by the comparatively long filaments or fibers of the filler material in the composition being molded.

Generally speaking, low-pressure molding as contemplated by the present invention may be described as consisting in loading the moldable plastic composition in or on a rigid mold member against which it is confined by a flexible molding or pressure transmitting member, for instance, a rubber blanket or bag, after which it is hermetically sealed between said mold members and air evacuated therefrom. The loaded mold is then placed in an autoclave or pressure chamber where it is subjected to heat and pressure while connected to a source of vacuum for the purpose of evacuating air and any gases that may be generated within the mold during this molding step. However, when the molding surface of the rigid mold member has angles or concave areas therein and especially when the latter are of short radii and the filler filaments are capable of bridging or spanning the same, the pressure exerted on the flexible pressure transmitting member in evacuating air and gases from the confined material and in the actual molding operation is not sufficient to overcome the resistance or strength of such bridging filaments. As a result the composition is not pressed into uniform contact with the surface of the angles or concave areas of the mold and the finished, molded product will be found to be imperfect at these areas not only as regards the ultimate shape desired for the molded article but such areas in the molded article will not possess the desired density. A still further object of the invention, therefore, is to provide a method of molding plastic compositions with comparatively low-pressures wherein the composition is loaded in the mold with adequate material provided at points or areas necessary to insure the production of molded end products possessing the desired surface configuration and density regardless of the presence of angles or concave areas in the surface of the rigid mold member.

More specifically, the invention consists in forming in a web or sheet of moldable composition of the character indicated concavities at least of the same size as, and preferably somewhat larger than, the concave areas of the mold surface and utilizing this concave portion of the preliminarily shaped body of composition to insure the proper molding of said composition in the angles or concave areas of the mold surface. Preferably the web or body of composition which comprises a thermo-setting binder is preliminarily worked by pressure into what is called a preform which substantially corresponds to the shape of the rigid mold member surfaces except for the concave areas and in this preliminary shaping of the composition it is advantageous, as will be later explained, to raise the temperature of the composition to soften the binder so that when the preform cools it is rather rigid, it being understood, however, that the temperature used in this preforming step is not sufficiently high or of such duration as to effect a setting of the binder.

In the accompanying drawings in which several modifications of the present invention are illustrated more or less diagrammatically—

Figure 1 is a perspective view of a sheet of moldable composition of the character which is especially adapted for use in practicing the present invention;

Fig. 2 is a fragmentary view of a rigid mold member showing, in section, a preliminary shaped body of composition confined against said member by a rubber blanket with a portion of the edge of said blanket secured by a clamping ring in sealing engagement with the mold member;

Fig. 3 is a perspective view illustrating the preliminary shaping of the body of composition shown in Fig. 2;

Fig. 4 is a view similar to Fig. 3 illustrating the formation of a concavity in a preliminarily shaped body of composition where it is desired to mold an undercut or concave surface in the molded article;

Figure 5:
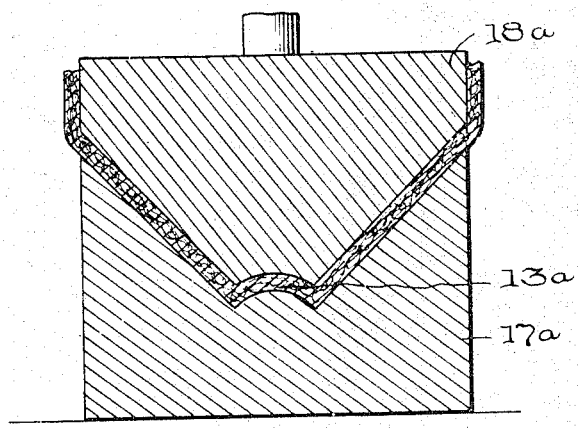
Fig. 5 is a view similar to Fig. 3 illustrating fabrication of the preliminary shape shown in Fig. 4.

For purposes of illustration, I have adopted the moldable composition shown in Fig. 1 which may be produced in accordance with the disclosure of United States Letters Patent No. 2,249,888, dated July 22, 1941, preferably using a stapled vegetable fiber filler and a thermo-setting synthetic resinous binder. This composition, described briefly, consists of a sheet or web of filler fibers 10 and binder, the web or sheet being stabilized by tufts or groups of fibers D which are produced by passing barbed needles through the web usually before the binder is applied. The binder may be used in solution form, or in dispersion, or in powdered form as disclosed in United States Letters Patent No. 2,372,433, dated March 27, 1945.

With material of this type it is difficult if not impossible to force the same into intimate contact with the angles or concave areas of short radii in a mold surface in low-pressure molding because of the pressures used and the flexibility and resiliency of the rubber blanket or bag used as the pressure transmitting member. In accordance with the present invention this difficulty is overcome by preliminarily shaping the material, that is, prior to its being loaded on the rigid molding surface, to form concave areas in that face thereof which is placed against said rigid molding surface and using these concave portions of the preliminarily shaped material to effect ultimate contact with the angular surfaces or concavities of the rigid molding surface. This can be effected in various ways. For instance, as shown in Figs. 2 and 3, where it is desired to insure the molding composition being forced into the corners formed by the sides 11 and bottom 12 of the rigid mold member, the preliminarily shaped body of composition is formed with a dished or concave surface 13 which might be termed its bottom and which is preferably of a width and length substantially corresponding to, or slightly greater than, that of the bottom 12 of the mold. Thus, after the blanket 15 has been applied and sealed with the clamping ring 16, and the vacuum line, indicated at 14, is connected to the mold assembly, the molding material and blanket will be drawn toward the rigid mold and this movement will tend to flatten the dished or concave portion 13 of the material and force the material into the corners or angles of the rigid mold. In other words, when the mold is first loaded and vacuum applied outside the autoclave the arc is crushed by the pull of the vacuum but the pull is first felt at the center of the arc and moves outward toward the corners. Thus the stock or material bunches into the corners. Not enough pressure is available from the vacuum at this time to force the blanket all the way into the corners and only when the steam is applied later in the autoclave is there enough pressure to mold successfully. However, by having previously forced the material into the corners by collapsing the arc or dished portion, the blanket is permitted to reach its fullness under the steam pressure in the autoclave at what would normally be the points of greatest resistance, i. e., the concavities as there is no bridging of those concavities by the filler material. Due to the flexibility and resiliency of the blanket it may be desirable to press the blanket into the corners as much as possible before the loaded mold is placed in the autoclave for the final molding operation. In any event, at the time the loaded mold is placed in the autoclave the dished portion of the material will have been forced against the mold so that excess material will be bunched in the corners or angles. Thus, there will be ample material present at these points to insure good molding under the pressure conditions in the autoclave. After the loaded mold is placed in the autoclave the vacuum line is again connected and the requisite pressure and temperature conditions set up in the autoclave for setting or curing the resin binder. It will be appreciated that the crushing of the dished portion of the preform by the initial application of vacuum may be done with the loaded mold within the autoclave instead of outside but where this is done, steam should not be admitted to the autoclave until after the dished portion has been flattened because the temperature should not be raised before the dished portion has flattened.

The preliminary shaping of the sheet of composition may be carried out through the use of a forming member or block 17 (Fig. 3) whose surfaces may substantially conform to those of the rigid mold member except for that portion of the block which produces the concavity in the preliminarily shaped body of composition. In other words, it is preferred that the sheet be preliminarily shaped to substantially correspond to the rigid mold member although this is not essential so far as the present invention is concerned, the important feature being the formation of the dished or concave area in the face of the composition which is placed against the rigid mold member. In preliminarily shaping the web of composition it is also desirable and preferable to heat the same to a temperature sufficiently high to partially advance the resin binder so that when the preliminary shape cools it is comparatively rigid. For this purpose the web of composition can first be subjected to infra-red heating media and then, as soon as it has been subjected to the desired temperature for the requisite period of time it is placed on the former block 17 and shaped while hot. For the usual, commercial synthetic thermo-setting resin binders on the market today, it has been found that this heating of the web is preferably carried out at temperatures ranging from 250° F. to 270° F. for a period of between seven and eight and one-half minutes, under which circumstances the cooled preliminary shape will possess the desired rigidity and the binder will again soften and flow in the final molding step for curing the binder.

In the modification illustrated in Figs. 4 and 5, the web of composition is formed with an elongated concave area 13ª which is disposed opposite to the concave portions 18 connecting the bottom 12 and sides 11 of the rigid mold member, this representing the type of mold used for molding undercuts. Here, again, rigidity is imparted to the preliminary shape as previously described and in order to insure the presence of an ample quantity of material for the undercut portion 18 of the mold, the concave portion 13ª of the preshaped material may be formed on a radius exceeding that of the concavity 18 in the mold wall. Thus, when the concave portion 13ª is finally forced or pressed into the concavity 18, the surface of the latter will be intimately contacted by the molding composition and the finished molded article will possess the desired density and surface contour. In this instance a former block such as indicated at 17ª in Fig. 5 is used and, of course, the preliminary shape is heat treated as previously described.

Figure 6:
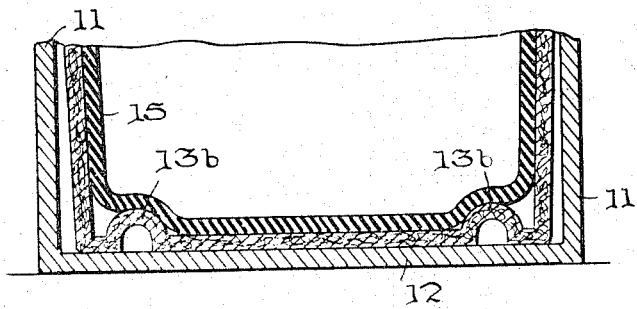
Fig. 6 illustrates another form of preliminary shape used in conjunction with mold surfaces having angular corners.
Figure 7:
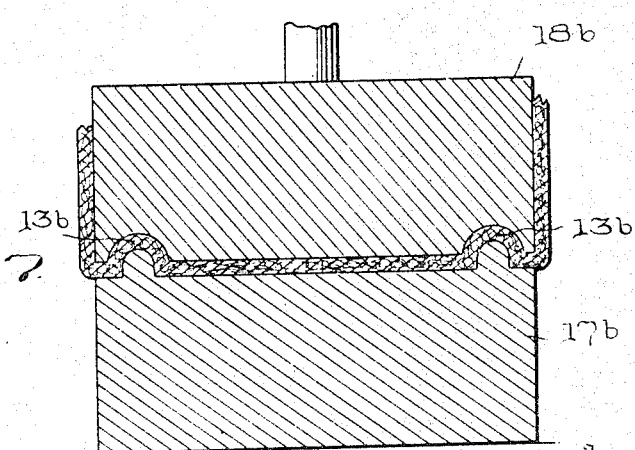
Fig. 7 is a view similar to Fig. 3 illustrating fabrication of the preliminary shape shown in Fig. 6.

Fig. 6 illustrates another procedure for insuring proper molding in the angles or corners formed, for instance, by the sides 11 and bottom 12 of the rigid mold member. Instead of dishing the entire bottom of the preliminary shape as in Figs. 2 and 3, the preshaped material may be formed with elongated concave areas 13$^b$ to be disposed adjacent and longitudinally of the corners of the mold. As will be apparent, these concave areas, under the influence of the vacuum and the molding pressure in the autoclave will insure intimate contact of the molding material with the mold surface in the corners and an ample supply of material for obtaining the desired density in such areas.

In addition to producing molded articles having the desired contours and density at corners or convex areas on their surface, the use of concave areas in the preliminarily shaped bodies of molding composition has the further advantage of facilitating the evacuation of air and gases from the material when confined in the mold and this, in turn, aids in forcing the material against the rigid mold surface. The evacuation of molds in low-pressure molding is fully disclosed in United States Letters Patent No. 2,376,805, dated May 22, 1945, and in the present instance it will suffice to point out that the concave portions of the present preliminary shapes are the last of the shape to be pressed tightly against the mold and thus tend to maintain communication, so to speak, between the vacuum vents and the inner surface areas of the shape confined in the mold.

The preshaping of the material while hot also has dual advantages. First, rigidity is imparted to the preshape to insure the material being forced into the corners or concavities of the mold. Secondly, the bulk factor of the material is reduced which is another item which tends to insure efficient molding. For instance, a web of resin treated fibers such as illustrated in Fig. 1 has a bulk factor of approximately four to one. That is, material one-quarter inch thick is reduced to a thickness of one-sixteenth inch in the finished molded article or, in other words, the face of a preshape next to the confining blanket 15 must travel three-sixteenths of an inch toward the rigid mold member in the final molding. However, as previously stated, bridging of filler fibers across the concavities of the rigid mold prevent this travel or reduction in bulk at those points. Therefore, preshaping the material while hot and reducing its bulk factor at this time eliminates the necessity of effecting complete reduction of bulk in the final molding operation; prevents bridging of the concavities in the mold by the filler fibers and insures good molding.

Usually, the expression "low-pressure" molding is used to denote molding methods of the character previously described and in which the molding pressures do not exceed 300 pounds per square inch although there might be some instances where higher pressures might be used. Also, while sisal fibers are preferred for the filler, it will be appreciated that other types of filamentary elements of vegetable or non-vegetable origin may be utilized. Likewise, various thermo-setting binders may be used although at the present phenolic and amino condensation products are believed preferable.

What is claimed is:

1. In the method of molding a sheet of moldable plastic composition of thermo-setting resinous binder and a filler of comparatively long vegetable fibers against a molding surface having a radius or angle forming a concavity therein capable of being bridged by the filler fibers wherein said sheet is confined against said molding surface by a flexible pressure transmitting member, the steps of forming in said sheet prior to placing it on the mold surface a concave area at least equal to that of the concavity in the mold surface but with the concavity in the face of the sheet to be positioned against the mold surface, partially curing the resin content in the concave portion of the sheet to increase the rigidity of said portion, placing said sheet on the mold surface with its concave portion in registry with but oppositely disposed with respect to the concavity in the mold surface, forcing said sheet against said mold surface and into said concavity, and subjecting the same to a curing temperature.

2. In the method of molding a sheet of moldable plastic composition of thermo-setting resinous binder and a filler of comparatively long vegetable fibers against a molding surface having a radius or angle forming a concavity therein capable of being bridged by the filler fibers wherein said sheet is confined against said molding surface by a flexible pressure transmitting member, the steps of forming in said sheet prior to placing it on the mold surface a concave area at least equal to that of the concavity in the mold surface but with the concavity in the face of the sheet to be positioned against the mold surface, partially curing the resin content in the concave portion of the sheet to increase the rigidity of said portion, placing said sheet on the mold surface with its concave portion in registry with but oppositely disposed with respect to the concavity in the mold surface, applying said confining pressure transmitting member to said sheet, exhausting air from the space in which the sheet is thus confined to draw the sheet against the surface of the mold surrounding the concave portion of the latter, the opposed concave portions of the mold and sheet facilitating said exhausting of air, and finally subjecting said confined sheet to a molding pressure to force the concave portion of said sheet into the concavity of the mold and to a temperature to set said binder.

PAUL E. BOWES.

REFERENCES CITED

The following references are of record in the file of this patent:

UNITED STATES PATENTS

| Number | Name | Date |
|---|---|---|
| 2,251,477 | Wisman | Aug. 5, 1941 |
| 2,376,805 | Peacock | May 22, 1945 |
| 2,378,642 | Kopplin | June 19, 1945 |